(12) United States Patent
Abdalla et al.

(10) Patent No.: US 7,955,500 B2
(45) Date of Patent: Jun. 7, 2011

(54) OVAL SEAL CARTRIDGE WITH NO DIRTY DRIP

(75) Inventors: Wassem Abdalla, Cookeville, TN (US); Zemin Jiang, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 872 days.

(21) Appl. No.: 11/985,607

(22) Filed: Nov. 16, 2007

(65) Prior Publication Data

US 2009/0127172 A1    May 21, 2009

(51) Int. Cl.
*B01D 35/153* (2006.01)
(52) U.S. Cl. ............... 210/117; 210/234; 137/533.11
(58) Field of Classification Search .......... 210/136, 210/236, 117, 234, 235; 137/533.11, 533.13, 137/519.5, 39
See application file for complete search history.

(56) References Cited

U.S. PATENT DOCUMENTS

| | | |
|---|---|---|
| 2,103,427 A * | 12/1937 | Long ........................ 137/515.5 |
| 3,363,762 A | 1/1968 | Ensign |
| 4,303,514 A | 12/1981 | Theorell |
| 5,049,269 A | 9/1991 | Shah |
| 5,215,655 A | 6/1993 | Mittermaier |
| 5,770,065 A | 6/1998 | Popoff et al. |
| 5,846,417 A | 12/1998 | Jiang et al. |
| 5,855,780 A | 1/1999 | Dye et al. |
| 6,053,334 A | 4/2000 | Popoff et al. |
| 6,113,781 A | 9/2000 | Popoff et al. |
| 6,495,042 B1 | 12/2002 | Knight |
| 6,554,139 B1 | 4/2003 | Maxwell et al. |
| 6,555,000 B2 | 4/2003 | Knight |
| 6,884,349 B1 * | 4/2005 | Jiang ........................ 210/234 |

* cited by examiner

*Primary Examiner* — Terry K Cecil
(74) *Attorney, Agent, or Firm* — Hamre, Schumann, Mueller & Larson, P.C.; J. Bruce Schelkopf

(57) ABSTRACT

An assembly is disclosed that includes a centerpost assembly and a fluid filter cartridge. The centerpost assembly includes a main body having an inlet flow opening, an open interior, and a radial flange. An interior shelf is positioned proximate the inlet flow opening of the main body. The interior shelf includes an interior flow opening. A check valve ball is movably positioned on the interior shelf to move between the inlet flow opening and the interior flow opening. A spring-loaded end cap is movably connected to an upper end of the main body and is configured to move between a compressed state and an uncompressed state. A blocking pin extends from a lower surface of the end cap. When the end cap is in the compressed state, the blocking pin prevents the check valve ball from blocking a flow of fluid from flowing through the interior flow opening.

28 Claims, 15 Drawing Sheets

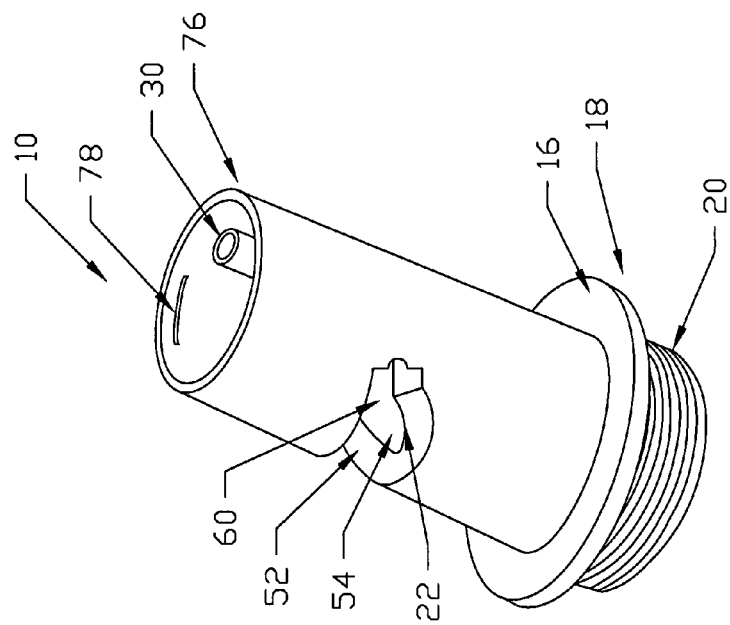
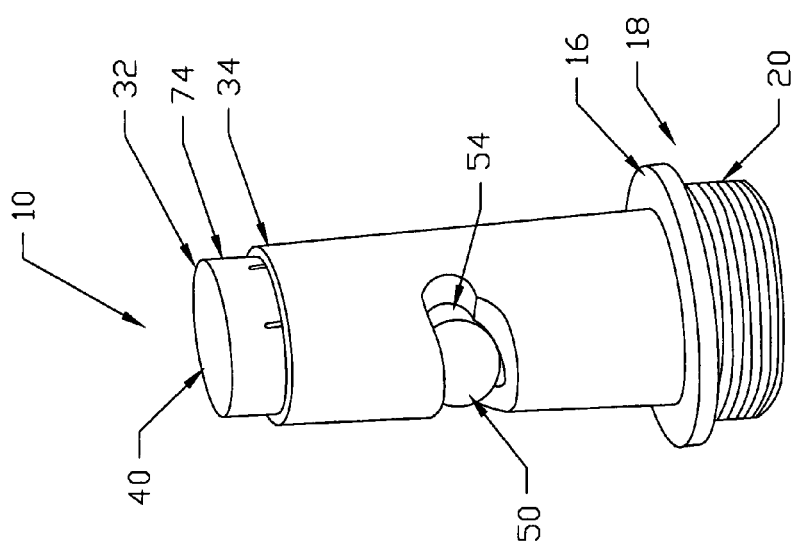
Fig. 3
Fig. 2

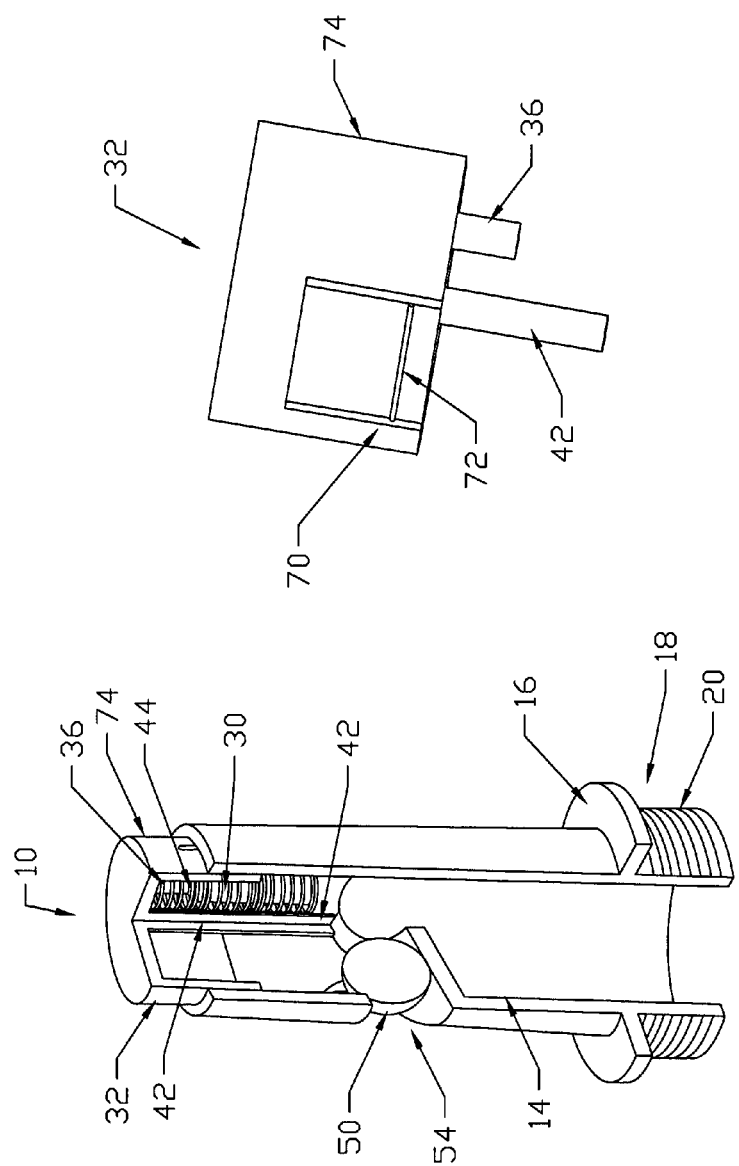

OVAL SEAL CARTRIDGE WITH NO DIRTY DRIP

FIELD OF THE INVENTION

The present invention relates generally to fluid filtration devices used to filter an incoming fluid prior to utilization of that fluid downstream and more particularly, but not exclusively, to a method, system and arrangement for preventing delivery of fluid downstream if an improper filter cartridge is installed and for eliminating dirty fluid.

BACKGROUND

Fluid filtration systems are an important component of motor vehicles and the like because of the tight design tolerances required by modern engines. No matter how carefully fuel is handled, contaminants find their way into fuel during transfer, storage, or even inside vehicle tanks. Contaminated fuel can cause damage to fuel pumps, fuel injectors, pistons, valves and so forth. One concept of the present invention is preventing fuel delivery to the engine if a proper filter cartridge is not installed on a centerpost assembly. If a proper filter cartridge is not installed, fuel is prevented from being supplied to the engine and therefore the engine will not run.

SUMMARY

One embodiment of the present application discloses a fluid filtration assembly that prevents filter cartridges that are not approved by the original equipment manufacture from being used and also prevents dirty fuel from dripping into the clean side of the filter. Other embodiments include unique apparatus, devices, systems, and methods for removing contaminates from fuel and ensuring that dirty fuel does not drip into the clean side of the fuel filter while at the same time ensuring that only original equipment manufacturer approved filter cartridges are used in the fuel filtration system. Further embodiments, forms, objects, features, advantages, aspects, and benefits of the present application shall become apparent from the detailed description and figures included herewith.

BRIEF DESCRIPTION OF THE DRAWINGS

The figures are not necessarily to scale, emphasis instead being placed upon illustrating the principles of the invention. Moreover, in the figures, like reference numerals designate corresponding parts throughout the different views.

FIG. 2 is a perspective view of the fluid filter centerpost assembly illustrated in FIG. 1.

FIG. 3 is a perspective view of the fluid filter centerpost assembly without an end cap.

FIG. 4 is a partial cutaway view of the fluid filter centerpost assembly illustrated in FIG. 1.

FIG. 5 is a perspective view of the end cap of the fluid filter centerpost assembly illustrated in FIG. 1.

DETAILED DESCRIPTION

Figure 1:
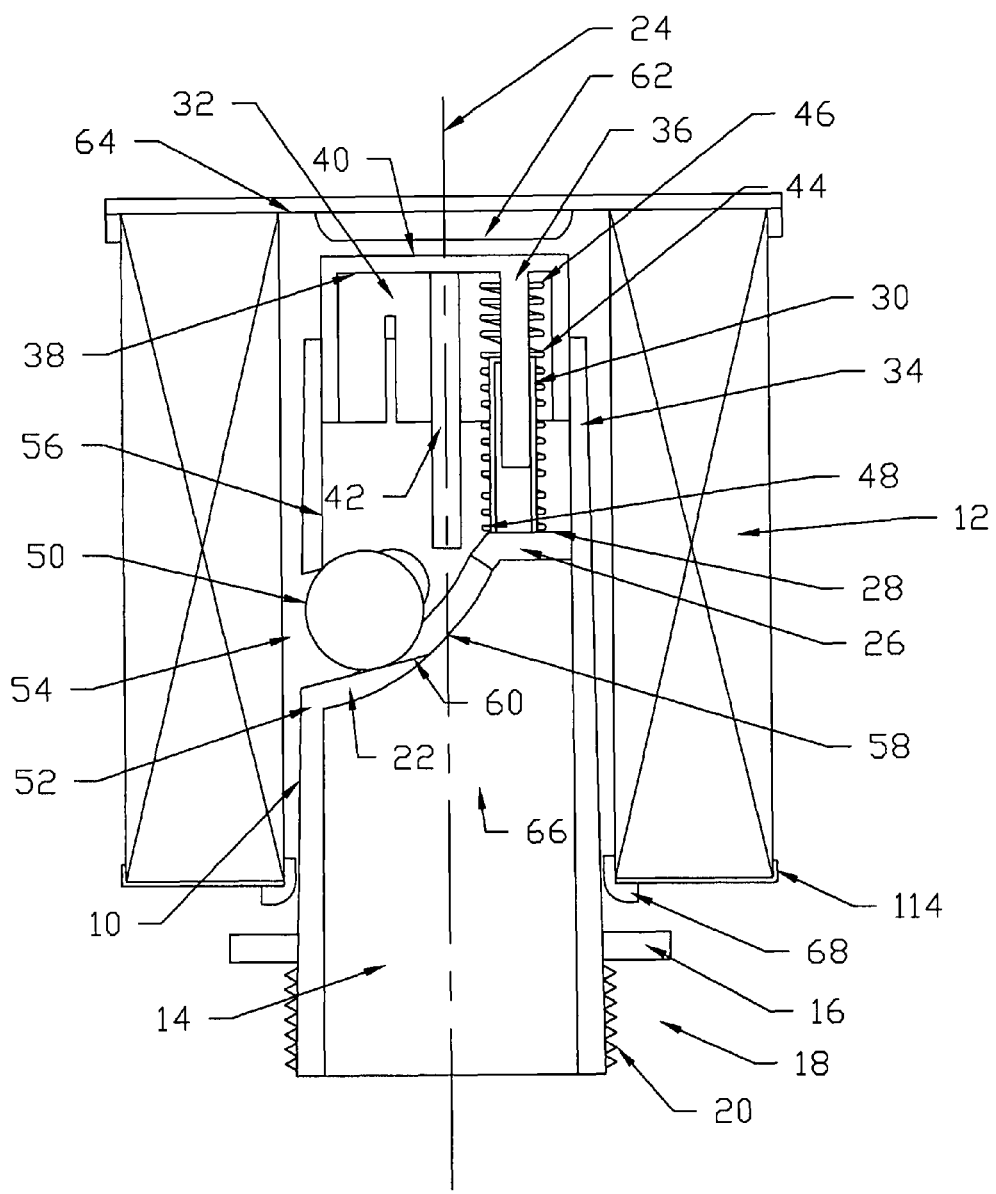
FIG. 1 is a full cross-sectional view of a fluid filter centerpost assembly in combination with a fluid filter cartridge.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

Referring to FIG. 1, portions of a fuel filter that depict the structure of the present invention are diagrammatically illustrated. These portions include, in combination, a fluid filter centerpost assembly 10 and a fluid filter cartridge 12. One form of centerpost assembly 10 is further illustrated in FIGS. 2-7. Another representative form of centerpost assembly 10 is illustrated in FIG. 8. The fluid filter cartridge, and components thereof, is further illustrated in FIGS. 9-15.

Referring collectively to FIGS. 2-7, the centerpost assembly 10 includes a hollow main body 14 that comprises a molded plastic structure. The centerpost assembly 10 includes an integral radial flange 16 generally adjacent a lower end 18 of the centerpost assembly 10. An externally threaded portion 20 is also included at the lower end 18 of centerpost assembly 10. An inclined interior shelf 22 is located at approximately the middle of the centerpost assembly 10. Shelf 22 is inclined at an approximate 30° angle relative to an axial centerline 24 of main body 14. An upper portion 26 of shelf 22 includes a flat segment 28 that includes a hollow post 30 that protrudes upwardly from flat segment 28 a predetermined distance inside main body 14.

A sliding cap 32 is positioned within an inside diameter of an upper end 34 of main body 14. The upper end of main body 14 is generally oval in shape and has a diameter somewhat smaller than lower end 18 of main body 14. A cylindrical retention member or post 36 protrudes downwardly from a lower surface 38 of a top 40 of cap 32. As illustrated, retention post 36 slidably fits within an inside diameter of hollow post 30 of main body 14. A blocking member or pin 42 also protrudes downwardly from lower surface 38 of cap 32 at approximately the axial centerline 24 of main body 14 such that cap 32 is operable to slide up and down inside main body 14. Blocking pin 42 is somewhat longer than retention post 36 and may be cylindrical shaped, square shaped, or plus ("+") shaped. Top 40 of cap 32 is solid so that no fluid can enter main body 14 through cap 32 when a proper filter cartridge 12 is installed.

A coil spring 44 is positioned around an outside diameter of post 30 and an outside diameter of retention post 36. As such, spring 44 is assembled between cap 32 and post 30. An upper surface 46 of spring 44 is positioned on lower surface 38 of cap 32 and a lower surface 48 of spring 44 is positioned on flat segment 28 of shelf 22. Spring 44 pushes or forces cap 32 upwards at all times such that, as set forth in detail below, if a proper filter cartridge 12 is not placed around centerpost assembly 10, a check valve ball 50 positioned on shelf 22 will not allow filtered fluid or fuel to enter main body 14 of centerpost assembly 10.

A sidewall 52 of main body 14 defines an inlet flow opening 54 that is positioned just above the location where shelf 22 is unitarily joined (i.e.—molded) to an inside surface 56 of main body 14. Shelf 22 defines a central flow opening 58 and a recessed track 60 (See FIG. 7). In one form, the geometric center of central flow opening 58 is concentric with main body 14 and coaxial with centerline 24. Check valve ball 50 rides in recessed track 60 and is movable across the upper surface of shelf 22 in response to incoming fuel flow from inlet flow opening 54. As would be understood, due to the inclined nature of shelf 22, check valve ball 50 will naturally position itself between interior shelf 22 and the inside surface 56 of main body 14.

During operation, the incoming flow of fuel through inlet flow opening 54 and the pressure from that flow moves check valve ball 50 toward the center of central flow opening 58. In one form, check valve ball 50 is a molded plastic sphere and is designed to be light in weight such that virtually any fuel flow pressure is capable of moving check valve ball 50 in the direction of central flow opening 58. Further, the diameter of check valve ball 50 is sufficiently large that it has very little distance to move to be in a position to close off central flow opening 58. As indicated, this diameter size allows check valve ball 50 to rest against inside surface 56 at the edge of inlet flow opening 54 on one side and be adjacent central flow opening 58 on the opposite side. If check valve ball 50 moves to the center of central flow opening 58, check valve ball 50 is constructed and arranged to close off central flow opening 58 such that fluid or fuel is unable to reach any downstream location for utilization.

Sliding cap 32 is positioned within the inside diameter of the upper end 34 of main body 14 such that it slides up and down in response to pressure applied to the top 40 of cap 32. In one form, as illustrated in FIG. 1, a compression segment or member 62 of an upper end cap 64 of filter cartridge 12 presses down on the top 40 of cap 32 as filter cartridge 12 is installed on centerpost assembly 10. As such, when cap 32 is pressed downwardly in a compressed state, blocking pin 42 of cap 32 blocks or prevents check valve ball 50 from covering central flow opening 58 of centerpost assembly 10. Fluid or fuel entering inlet flow opening 54 is therefore allowed to pass through central flow opening 58 into a lower body 66 of main body 14 where it is allowed to exit through lower end 18 of main body 14 to be utilized by other system components downstream, such as an engine for example.

As set forth above, what prevents check valve ball 50 from closing off central flow opening 58 is the presence of blocking pin 42, which is an integral part of cap 32. Blocking pin 42 extends coaxially with centerline 24 such that it is in close proximity to central flow opening 58. During operation, check valve ball 50 is forced up recessed track 60 by a flow of fuel through inlet flow opening 54 toward central flow opening 58. The outside diameter of check valve ball 50 is large enough that the tip of blocking pin 42, when a proper filter cartridge 12 is installed thereby placing cap 32 in a compressed state, prevents movement of check valve ball 50 to a point where it can close off central flow opening 58. As such, even relatively slight movement of check valve ball 50 in the direction of central flow opening 58 results in abutment of the outer surface of check valve ball 50 against blocking pin 42, thereby stopping any further movement of check valve ball 50.

Cap 32 is forced downward by compression segment 62 of filter cartridge 12. When a filter cartridge 12 is not installed, coil spring 44 forces cap 32 into an upward position or compressed state such that blocking pin 42 is not able to block check valve ball 50 from covering central flow opening 58. When a proper filter cartridge 12 is installed, compression segment 62 of filter cartridge 12 forces cap 32 to a closed position or compressed state, thereby moving blocking pin 42 into a position that prohibits check valve ball 50 from covering central flow opening 58. A lower portion of compression segment 62 presses down on the top 40 of cap 32, thereby compressing cap 32 into a closed position. Although not specifically illustrated in FIG. 1, filter cartridge 12 is properly installed when a seal 68 of filter cartridge 12 reaches an upper surface of integral radial flange 16 of centerpost assembly 10. As readily apparent, as filter cartridge 12 is placed over main body 14, compression cap 62 eventually makes contact with the top 40 of cap 32 thereby forcing cap 32 to a compressed state such that blocking pin 42 is moved to a blocking position.

As set forth above, blocking pin 42 prevents check valve ball 50 from closing off central flow opening 58 and thus this arrangement, as illustrated and described, means that as long as there is a proper fluid filter cartridge 12 installed with compression segment 62 present, fuel will be permitted to flow to a downstream utilization site. However, without a proper fluid filter cartridge 12, there is nothing to prevent the closing off of central flow opening 58 by check valve ball 50. As described, once there is an incoming flow of fuel, the pressure of that flow readily moves check valve ball 50 up recessed track 60 in the direction of central flow opening 58, allowing the check valve ball 50 to seat and thereby close off central flow opening 58. With central flow opening 58 closed off by check valve ball 50, there is no path for the fuel to reach any downstream location.

Figure 6:
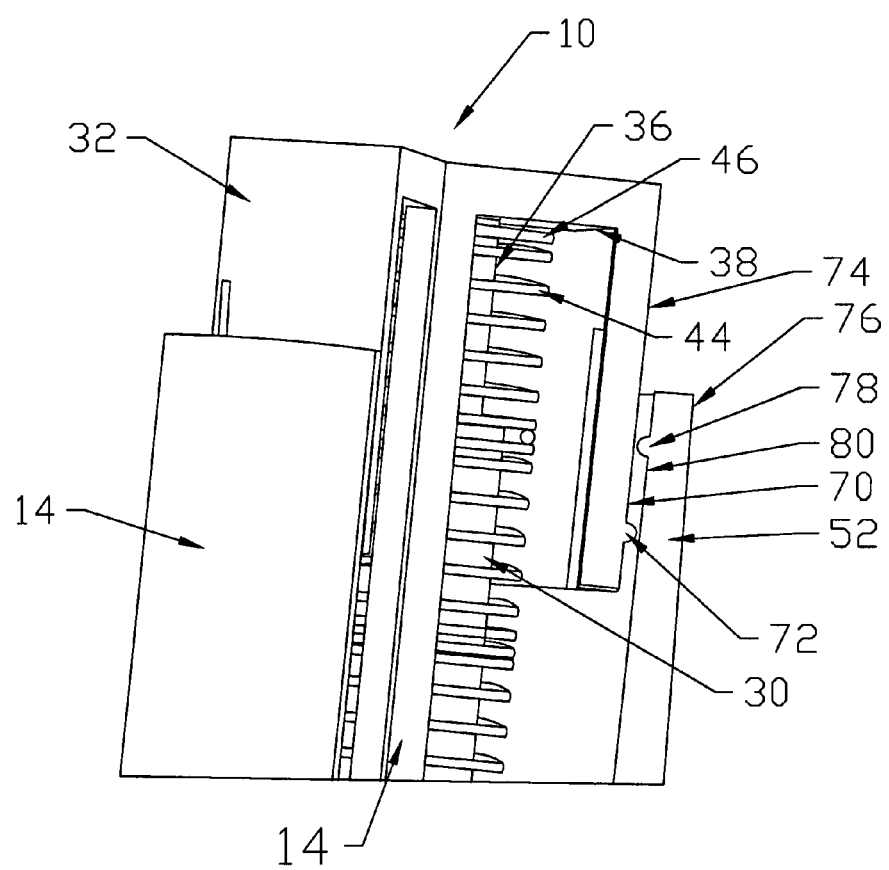
FIG. 6 is a cutaway view of the upper portion of the fluid filter centerpost assembly illustrated in FIG. 1.

Referring to FIGS. 5 and 6, a lower end 70 of cap 32 includes at least one external rib 72. External rib 72 protrudes outwardly a predetermined distance from a side surface 74 of cap 32. An upper end 76 of side wall 52 of main body 14 includes an internal rib 78 that protrudes outwardly a predetermined distance from an interior surface 80. External rib 72 and internal rib 78 prevent cap 32 from being forced out of the inside diameter of main body 14. As such, when cap 32 is not in a compressed state, coil spring 44 forces cap 32 upwardly until external rib 72 abuts internal rib 78, thereby stopping cap 32 from traveling upwardly any further. Cap 32 is designed such that a fluid tight seal is formed between cap 32 and main body 14.

Referring to FIG. 8, in another form, cap 32 fits over the outside diameter of the upper portion of main body 14. In this form, an upper end portion 90 of main body 14 has an outside diameter that is sized to receive cap 32. As such, the inside diameter of cap 32 is slightly larger than the outside diameter of the upper end portion 90 of main body 14. This allows cap 32 to slide up and down an outside surface 92 of the upper end portion 90. A lower end 94 of cap 32 includes an internal rib 96 that protrudes outwardly a predetermined distance from an inside surface 98 of cap 32. An upper end 100 of main body 14 includes an external rib 102 that protrudes outwardly a predetermined distance from an outside surface 104 of upper end portion 90. Internal rib 96 and external rib 102 prevent cap 32 from being forced off of main body 14. As such, when cap 32 is not in a compressed state, coil spring 44 forces cap 32 upwardly until internal rib 96 of cap 32 abuts external rib 102 of main body 14, thereby stopping cap 32 from traveling upwardly any further.

Figure 9:
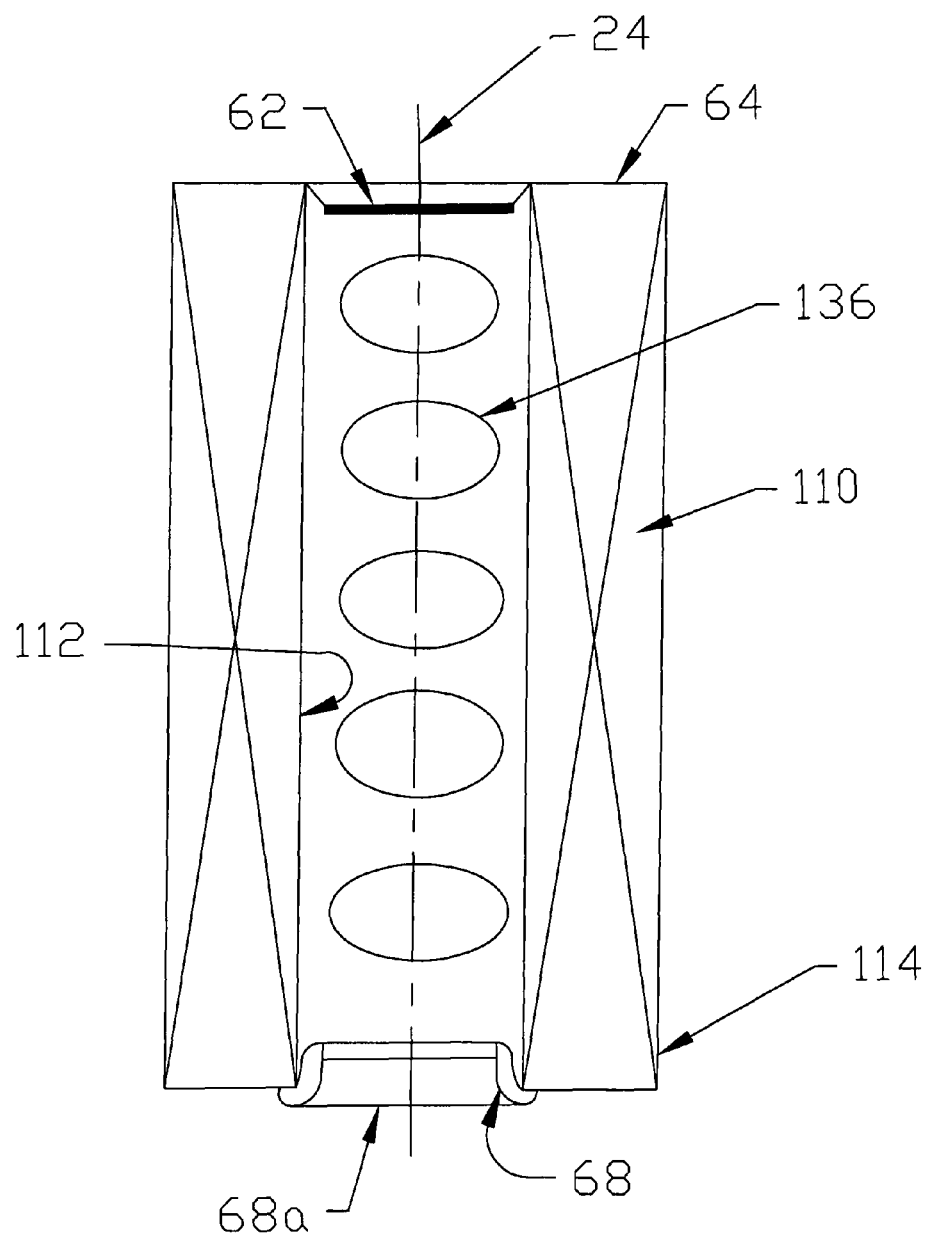
FIG. 9 is a front elevational view, in full cross-section, of a representative fluid filter cartridge.
Figure 10:
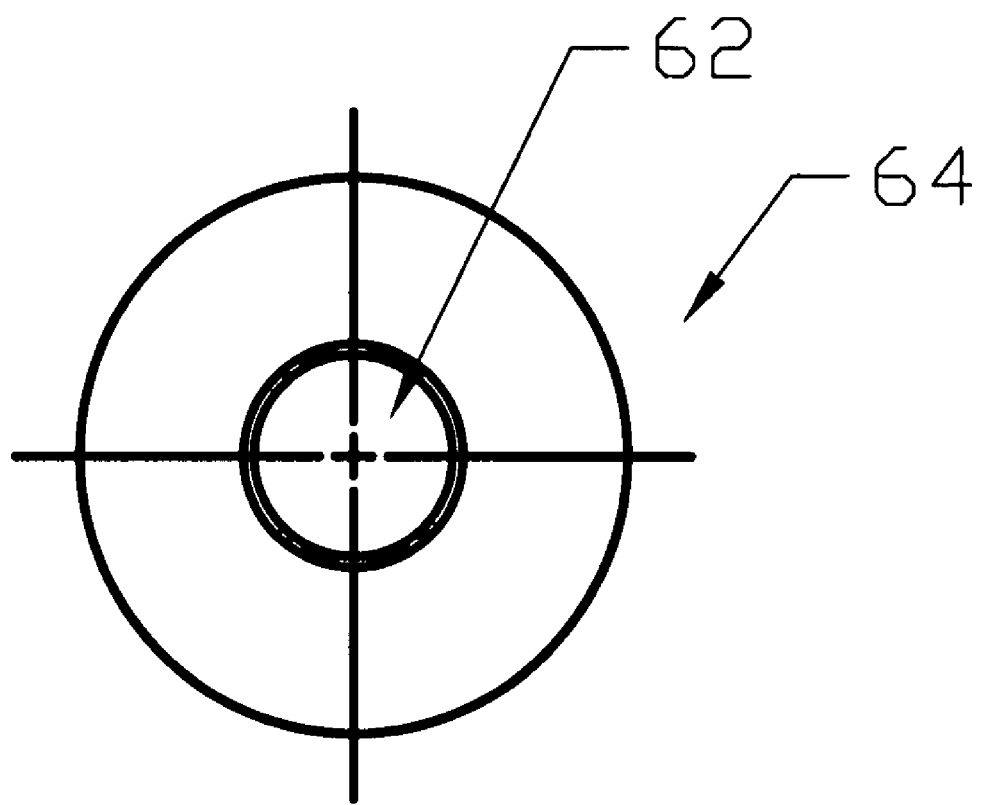
FIG. 10 is a top plan view of the FIG. 9 fluid filter cartridge.
Figure 11:
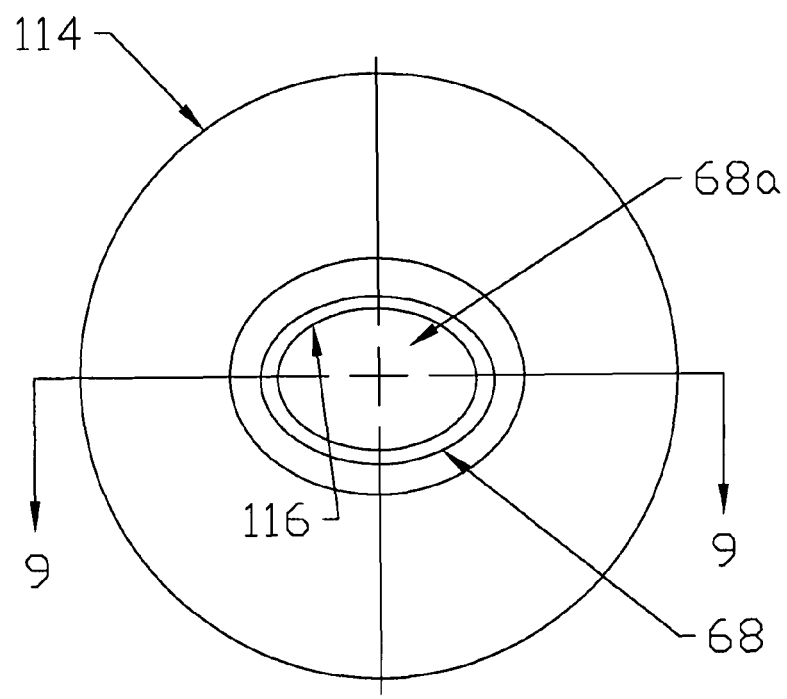
FIG. 11 is a bottom plan view of the FIG. 9 fluid filter cartridge.

With reference to FIGS. 9, 10, and 11, in one representative form filter cartridge 12 includes a filtering media 110, a centertube 112, closed endcap 64, an open endcap 114, and elastomeric seal 68 that is preassembled onto open endcap 114. The filtering media 110 and centertube 112 are each cylindrical and preassembled together such that the centertube 112 provides structural integrity and support to prevent filtering media collapse. Open endcap 114 is bonded to the lower end of the filtering media 110 and centertube 112. Closed endcap 64 is circular in shape and is bonded to the upper end of the filtering media 110 and centertube 112. As previously set forth, in one form compression member 62 is centered in closed endcap 64 and extends downwardly a predetermined distance such that when filter cartridge 12 is installed on centerpost assembly 10, it applies pressure to top 40 of cap 32 thereby placing cap 32 in a compressed state which forces blocking pin 42 in a position that blocks check valve ball 50. All of the assembled components of the filter cartridge 12 are concentric and coaxial in relation to centerline 24.

Figure 12:
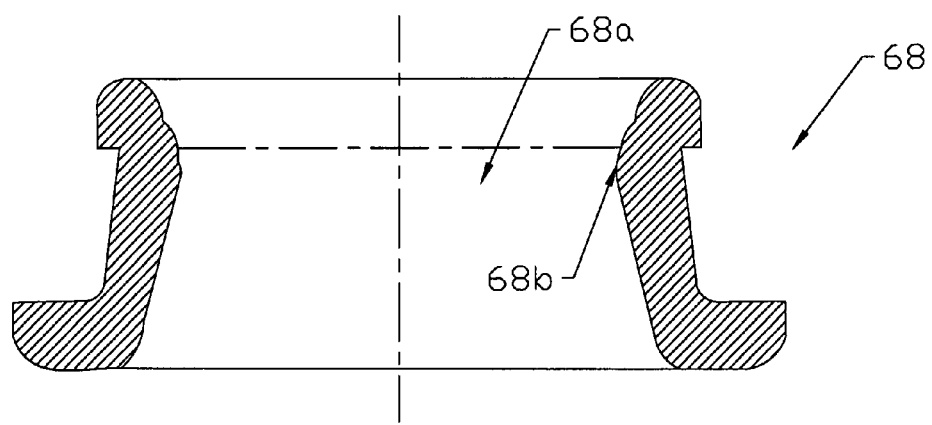
FIG. 12 is a front elevational view, in full cross-section, of the seal illustrated in FIG. 9.
Figure 13:
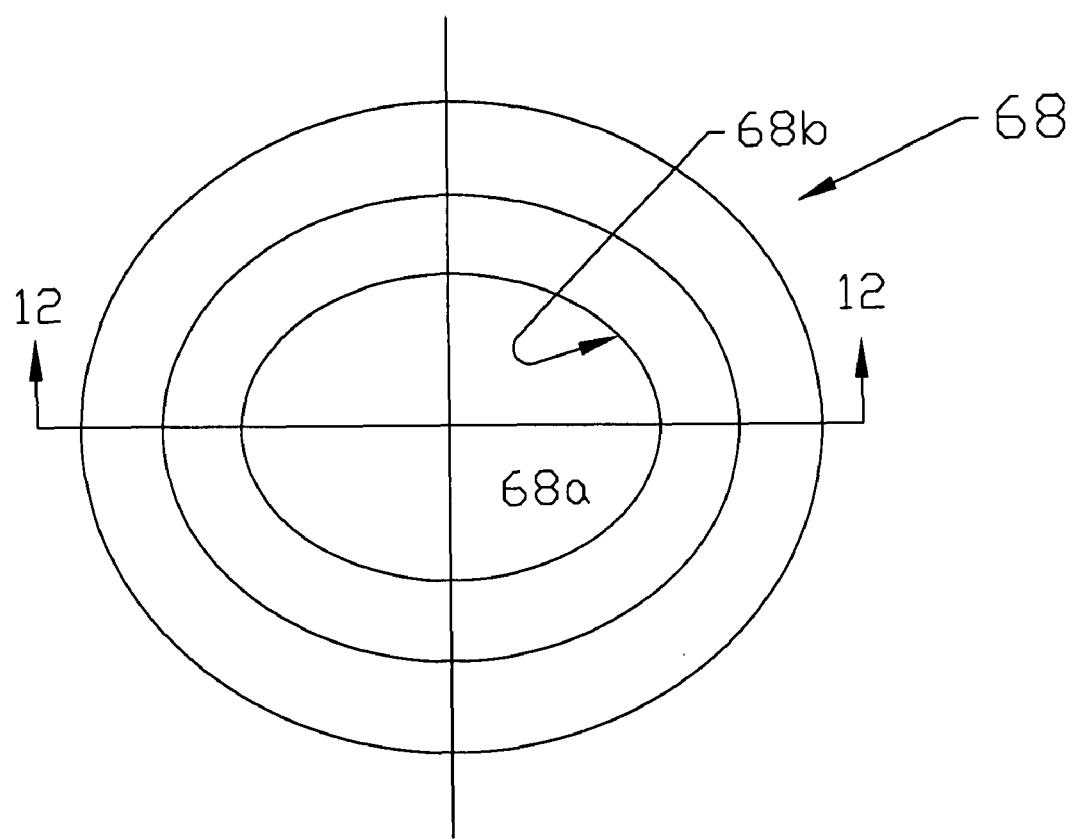
FIG. 13 is a top plan view of the FIG. 12 seal.
Figure 14:
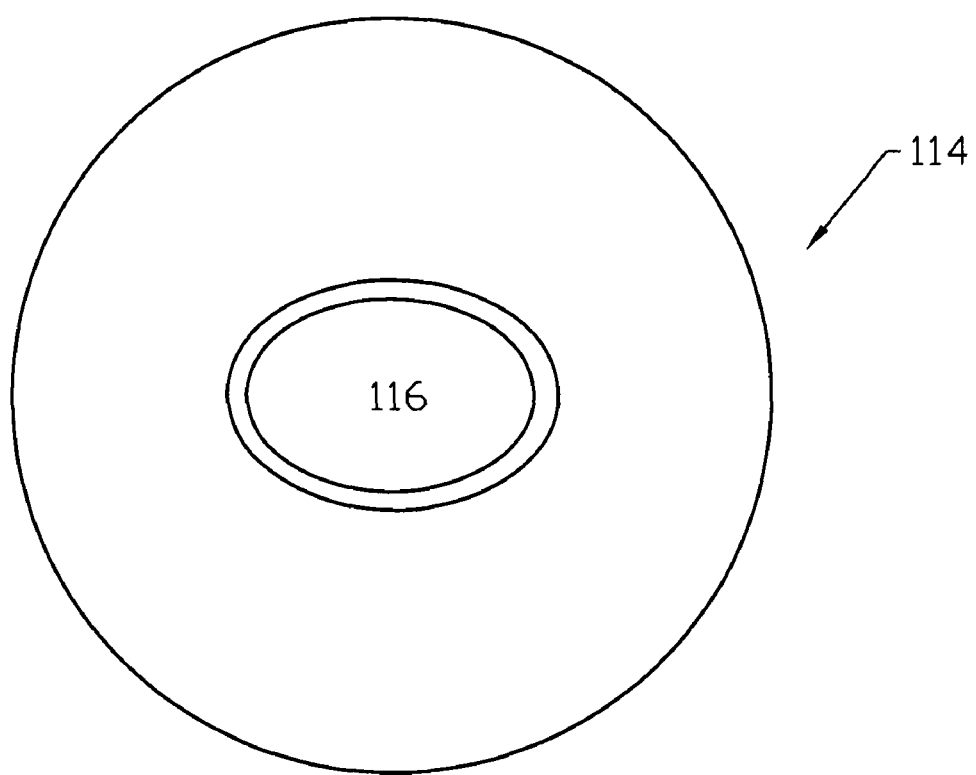
FIG. 14 is a bottom plan view of an open endcap comprising a portion of the FIG. 9 fluid filter cartridge.

While the filtering media 110, centertube 112, and endcap 114 are circular or cylindrical in overall shape, it is important to note that in one form elastomeric seal 68 is oval in shape, including an oval interior opening 68a. This in turn results in open endcap 114 having a circular outside diameter and an oval or elliptical opening 116 centered on axial centerline 24. The point of intersection of the major and minor axes of the oval shape coincides with axial centerline 24. The details of elastomeric seal 68 are illustrated in FIGS. 11, 12 and 13, including its oval shape. The oval shape of opening 116 and its centered position in endcap 114 are illustrated in FIG. 14.

As illustrated in FIG. 1, as fluid filter cartridge 12 slides down onto centerpost assembly 10, oval seal 68 slides down oval main body 14 until there is abutment of seal 68 against an upper surface of radial flange 16. Oval opening 68a is sized and shaped to generally match the size and shape of main body 14, but with moderate compression of an inner rib 68b (See FIGS. 12 and 13). It should be understood that support of oval seal 68 by radial flange 16 is facilitated and made more efficient by creating radial flange 16 with a corresponding oval shape and with sufficient size to fully receive seal 68. In order to establish a sealed interface around the oval main body 14, seal 68 includes a properly sized oval opening 68a that experiences some moderate compression for a leak-free radial seal against main body 14. The preassembly of seal 68 onto open endcap 114 requires that opening 116 have a corresponding oval shape. By applying a moderate force on filter cartridge 12 for its abutment against radial flange 16 and then maintaining that moderate force, an oval compression seal can also be established between fluid filter cartridge 12 and radial flange 16.

While the cooperating and supporting structures have been described in the context of FIGS. 1-7, an important focus of the present invention is the desire to create a fuel filter wherein there is a no filter cartridge-no run arrangement. This means that unless there is a "proper" filter cartridge 12 installed onto the centerpost assembly 10, it is not possible to have fuel delivered to any downstream location of utilization. While a few drops of fuel might flow through, the point to be recognized is that "no run" means insufficient fuel to perform any typical or normal engine functions. Critical to achieving this no filter cartridge-no run capability is the design of the inclined interior shelf 22, the use of check valve ball 50, and the presence of blocking pin 42. As illustrated by the top plan view of FIG. 7, in one form interior shelf 22 has an oval shape.

Figure 7:
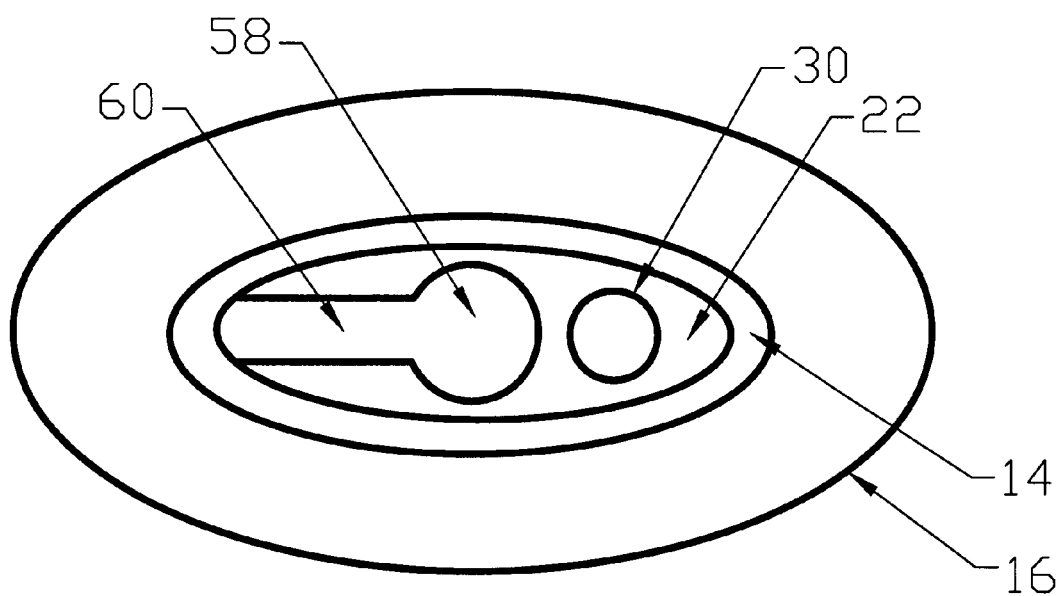
FIG. 7 is a top plan view of an interior shelf portion of the fluid filter centerpost assembly.
Figure 8:
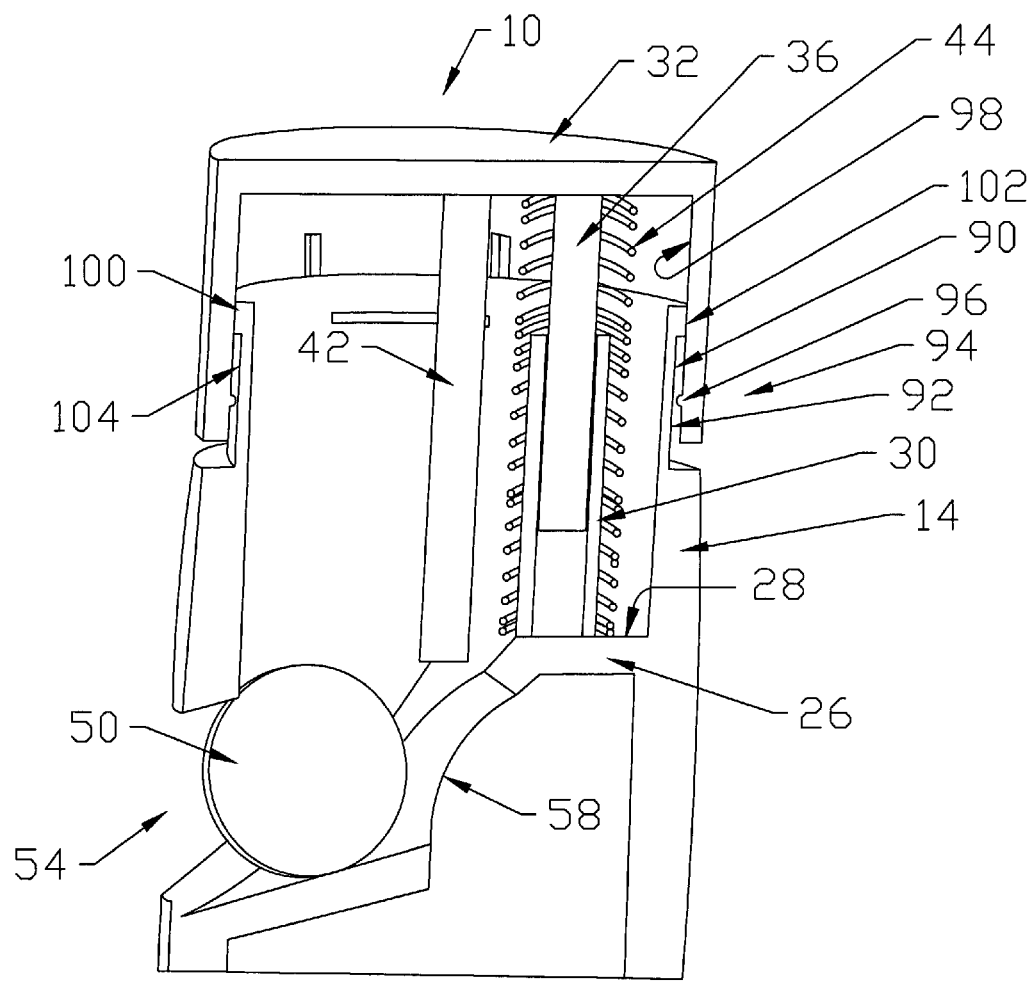
FIG. 8 is a cross-sectional view of an upper portion of another representative fluid filter centerpost assembly.

Referring to FIGS. 1 and 7, it will be seen, as described, that main body 14 has an oval or elliptical shape as does radial flange 16. The interior space defined by main body 14 is also oval or elliptical in shape and is closed off completely by interior shelf 22. The only opening or passageway for the flow of fuel is by way of flow opening 54. Recessed track 60 is shaped as a narrow channel that extends from flow opening 54 to the inside surface of main body 14. Notwithstanding the various shapes, openings, walls and curvatures, all of main body 14, including interior shelf 22 and radial flange 16, can be molded as a unitary component. This includes recessed track 60 and flow openings 54 and 58, as illustrated and described.

Figure 15:
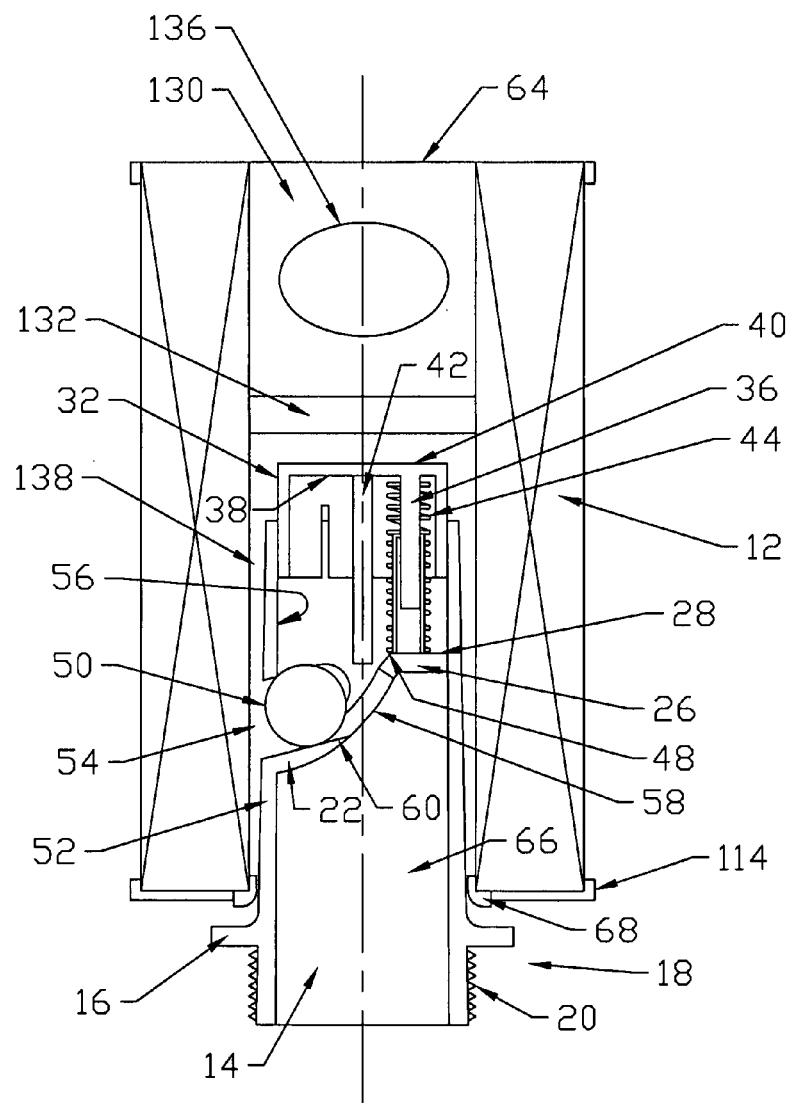
FIG. 15 is a full cross-sectional view of a fluid filter centerpost assembly in combination with another representative form of a fluid filter cartridge.
Figure 16:
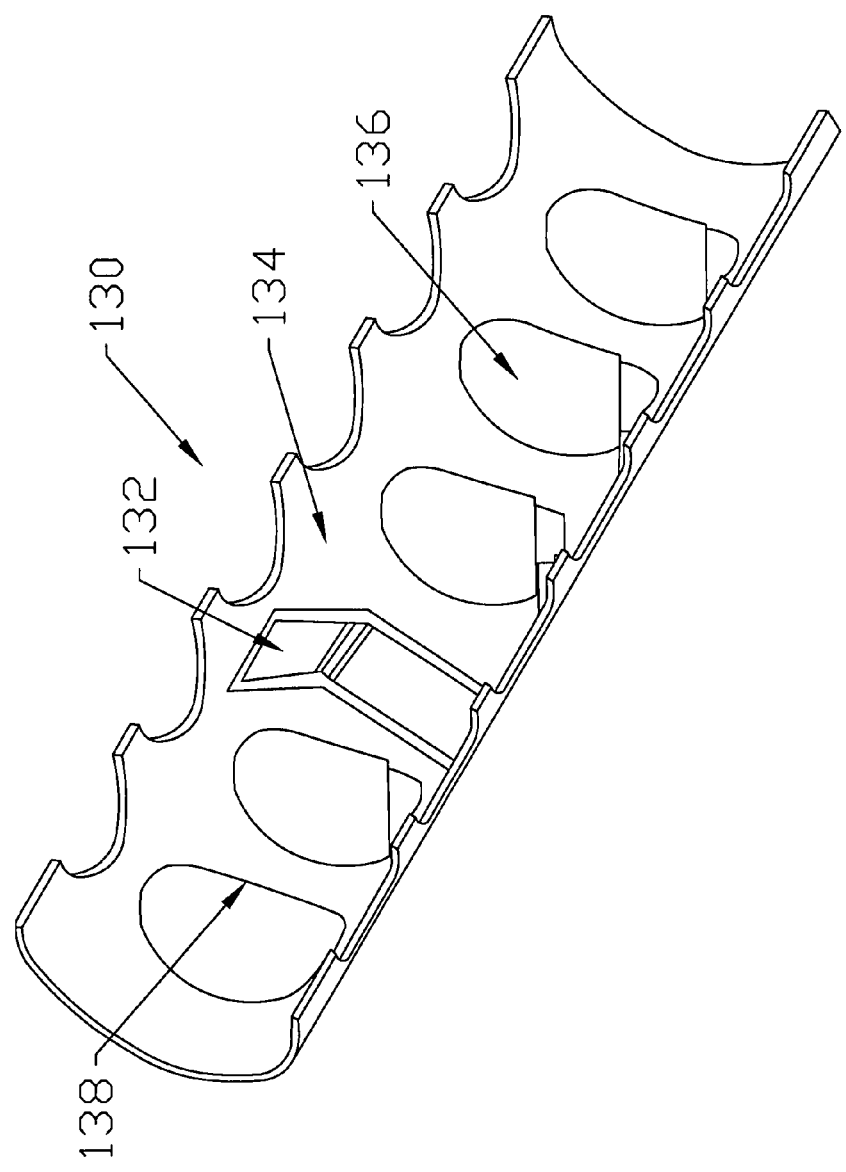
FIG. 16 is a full cross-sectional view of a centertube of the FIG. 15 fluid filter cartridge.

Referring to FIGS. 15 and 16, in another representative form filter cartridge 12 includes an elliptical or oval shaped centertube 130 that has a compression member or segment 132 connected with an inside surface 134 of centertube 130. As illustrated, in this form compression member 132 is not part of closed upper end cap 64. Compression member 132 is an integral part of centertube 130 and is connected with inside surface 134 of centertube 130. As further illustrated, centertube 130 includes a plurality of fluid apertures 136 that allow fluid to pass through filter media 110 into a central chamber 138 formed by centertube 130.

Figure 17:
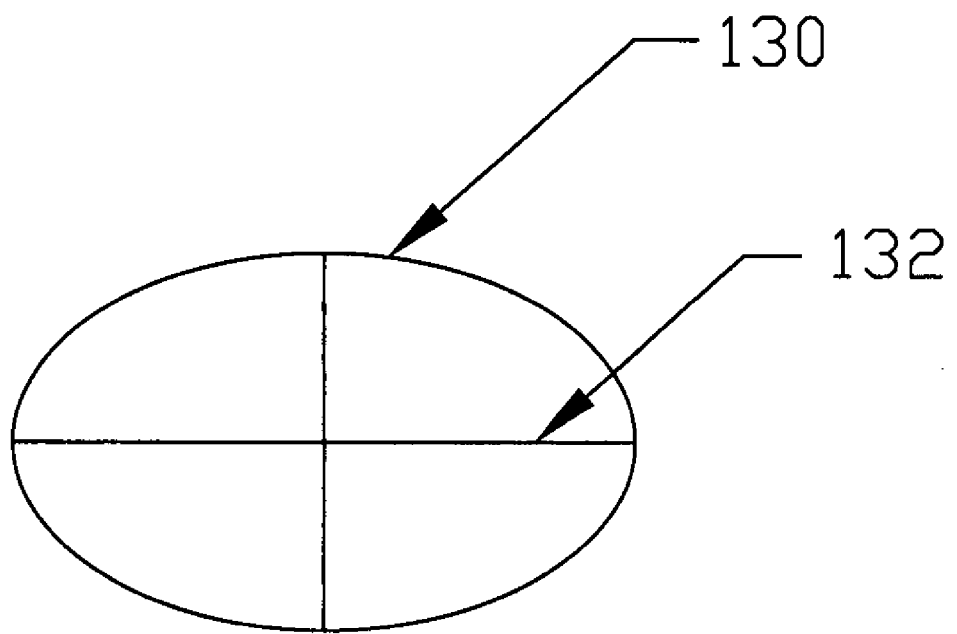
FIG. 17 is a top plan view of the FIG. 15 fluid filter cartridge.

As fluid flows into central chamber 138, it flows into the inlet flow opening 54 of centerpost assembly 10 thereby forcing check valve ball 50 up shelf 22, in recessed track 60, until it is blocked by blocking pin 42. As previously set forth with other forms of the present invention, when filter cartridge 12 is properly installed on centerpost assembly 30, cap 32 is moved by compression member 132 in centertube 130 to a compressed state, thereby moving the end of blocking member 42 into a position that blocks or prevents check valve ball 50 from covering central fluid opening 58. If check valve ball 50 is blocked from covering central fluid opening 58, then fluid or fuel is capable of flowing through centerpost assembly 10 for utilization downstream. Referring to FIG. 17, which depicts a top view of centertube 130, it should be appreciated that compression member 132 is shaped such that fluid is capable of flowing around compression member 132 while at the same time having enough structural integrity to compress cap 32.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An assembly, comprising:
a main body including an inlet flow opening on an outside surface of said main body and an open interior;
an interior shelf positioned proximate said inlet flow opening in said open interior of said main body, wherein said interior shelf includes an interior flow opening;
a check valve ball movably positioned on said interior shelf to travel between said inlet flow opening and said interior flow opening;
a spring-loaded closed end cap movably connected to an upper end of said main body configured to move between a compressed state and an uncompressed state; and
a blocking pin extending from a lower surface of said spring-loaded closed end cap, wherein when said spring-loaded closed end cap is in said compressed state said blocking pin prevents said check valve ball from blocking a flow of fluid from flowing through said interior flow opening.

2. The assembly of claim 1, wherein at least a portion of said interior shelf is inclined at a predetermined angle.

3. The assembly of claim 1, wherein said interior shelf includes a recessed track and said check valve ball travels on said recessed track.

4. The assembly of claim 1, wherein said spring-loaded closed end cap is oval in shape.

5. The assembly of claim 1, further comprising a hollow post protruding upwardly from said interior shelf, wherein a retention member protrudes downwardly from a lower interior surface of said spring-loaded closed end cap into said hollow post.

6. The assembly of claim 5, wherein a spring is positioned between said lower interior surface of a top of said spring-loaded end cap and an upper surface of said interior shelf, wherein said spring biases said spring-loaded end cap in said uncompressed state.

7. The assembly of claim 1, wherein said spring-loaded end cap is movably secured to said main body in said uncompressed state by abutment of a first retention rib of said spring-loaded end cap with a second retention rib of said main body.

8. The assembly of claim 1, further comprising a filter cartridge positioned around said main body.

9. The assembly of claim 8, wherein said filter cartridge includes a compression member operable to force said spring-loaded end cap into said compressed state when said filter cartridge is installed on said main body.

10. An assembly, comprising:
a main body defining a inlet flow opening on an outside surface of said main body and an open interior;
an interior shelf positioned proximate said inlet flow opening and including an inclined portion, an internal flow opening, and a post protruding upwardly from a portion of said interior shelf;
a check valve ball positioned on said inclined portion operable to travel between said inlet flow opening and said internal flow opening;
a closed end cap movably connected to an upper end of said main body having a retention member slidably engaged with said post and a blocking pin protruding downwardly from an upper interior surface of said closed end cap; and
a spring positioned in relation to said post and said retention member such that said closed end cap is biased in an upward uncompressed state, wherein compression of said closed end cap causes said blocking pin to move to a position that prevents said check valve ball from blocking a flow of fluid to said internal flow opening.

11. The assembly of claim 10, wherein said inclined portion includes a recessed track and said check valve ball travels on said recessed track.

12. The assembly of claim 10, wherein said closed end cap is positioned within an inside diameter of said main body.

13. The assembly of claim 10, wherein said closed end cap is positioned around an outside diameter of said main body.

14. The assembly of claim 10, further comprising a filter cartridge received by said main body.

15. The assembly of claim 14, wherein said filter cartridge includes a compression member that compresses said closed end cap to a compressed state thereby preventing said check valve ball from blocking said flow of fluid to said internal flow opening.

16. The assembly of claim 15, wherein said compression member protrudes downwardly a predetermined distance from a lower surface of an upper end cap of said filter cartridge.

17. The assembly of claim 15, wherein said filter cartridge includes a centertube and said compression member is formed as an integral part of said centertube.

18. The assembly of claim 14, wherein said filter cartridge includes an oval shaped seal that seals said filter cartridge to a radial flange of said main body.

19. In combination:
a fluid filter centerpost assembly comprising:
a main body defining an inlet flow opening and an open interior;
a spring-loaded end cap slidably connected to an upper portion of said main body including a blocking pin protruding downwardly from an inside surface of said spring-loaded end cap;
an interior shelf including a central flow opening; and
a check valve ball movably positioned on said interior shelf; and
a fluid filter cartridge received by said fluid filter centerpost assembly comprising:
a filtering media; and
a compression member for forcing said spring-loaded end cap to a compressed state when said fluid filter cartridge is installed on said fluid filter centerpost assembly to limit movement of said check valve ball in the direction of said central flow opening.

20. The combination of claim 19, wherein said interior shelf includes a recessed track and said check valve ball is positioned on said recessed track.

21. The combination of claim 19, wherein said interior shelf includes a post protruding upwardly from an upper surface of said interior shelf.

22. The combination of claim 21, wherein said spring-loaded end cap includes a retention member that protrudes downwardly from an inside surface of said spring-loaded end cap, wherein said retention member slidably engages said post.

23. The combination of claim 22, wherein a spring is positioned around said post and said retention member making contact with said upper surface of said interior shelf and said inside surface of said spring-loaded end cap thereby biasing said spring-loaded end cap in an uncompressed state.

24. The combination of claim 19, wherein said spring-loaded end cap fits within an inside diameter of said main body.

25. The combination of claim 19, wherein said spring-loaded end cap fits around an outside diameter of said main body.

26. The combination of claim 19, wherein said fluid filter cartridge includes a closed end cap assembled to one end of said filtering media.

27. The combination of claim 26, wherein said fluid filter cartridge includes an open endcap assembled to another end of said filtering media.

28. The combination of claim 27, wherein said fluid filter cartridge includes a seal received by said open endcap and being positioned around said main body and resting on a radial flange of said main body.

* * * * *